Figure 1:
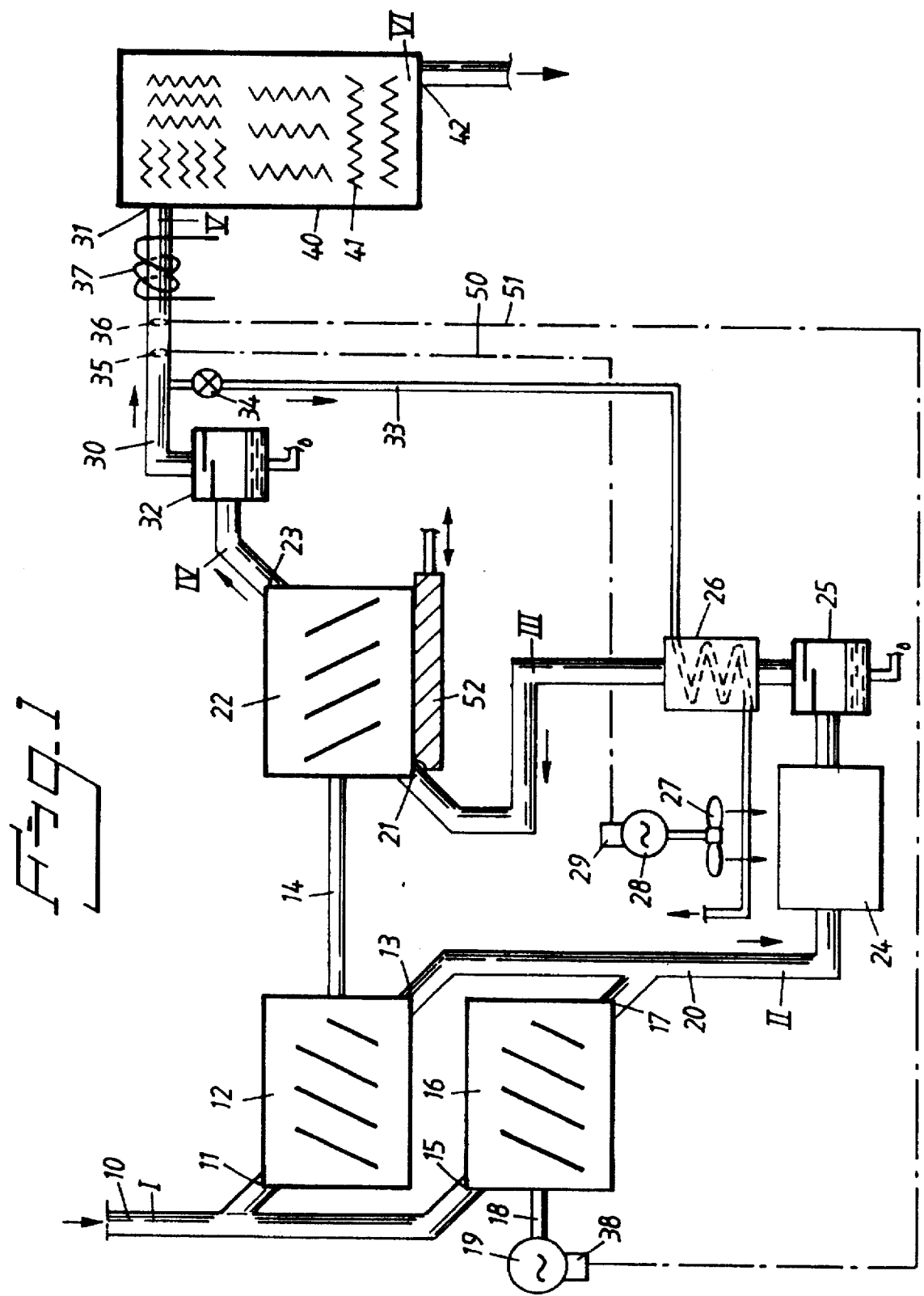

United States Patent

Thuresson et al.

[11] Patent Number: 5,732,560
[45] Date of Patent: Mar. 31, 1998

[54] SYSTEM AND METHOD FOR PERFORMING COOLING

[75] Inventors: Erik Thuresson, Älta; Henrik Öhman, Täby Kyrkby, both of Sweden

[73] Assignee: Svenska Rotor Maskiner AB, Stockholm, Sweden

[21] Appl. No.: 836,656

[22] PCT Filed: Nov. 17, 1995

[86] PCT No.: PCT/SE95/01372

§ 371 Date: May 16, 1997

§ 102(e) Date: May 16, 1997

[87] PCT Pub. No.: WO96/16302

PCT Pub. Date: May 30, 1996

[30] Foreign Application Priority Data

Nov. 17, 1994 [SE] Sweden ............. 9403966

[51] Int. Cl.$^6$ .................. F25B 9/00; F04B 17/00
[52] U.S. Cl. .................. 62/87; 62/172; 62/402; 417/408
[58] Field of Search .............. 62/172, 87, 116, 62/402; 417/408

[56] References Cited

U.S. PATENT DOCUMENTS

| | | | |
|---|---|---|---|
| 2,491,461 | 12/1949 | Wood | 165/15 |
| 2,585,570 | 2/1952 | Messinger et al. | 62/402 X |
| 3,045,447 | 7/1962 | Wagenius | 62/172 |
| 3,194,026 | 7/1965 | La Fleur | 62/88 |
| 3,686,893 | 8/1972 | Edwards | 62/402 |
| 3,965,697 | 6/1976 | Beierwaltes | 62/402 |
| 4,076,468 | 2/1978 | Persson et al. | 418/9 |
| 4,291,547 | 9/1981 | Leo | 62/402 |
| 4,820,135 | 4/1989 | Simmons | 417/408 |
| 4,934,154 | 6/1990 | Altoz et al. | 62/87 |

FOREIGN PATENT DOCUMENTS 42 18 299   12/1993   Germany.

*Primary Examiner*—William E. Wayner
*Attorney, Agent, or Firm*—Frishauf, Holtz, Goodman, Langer & Chick

[57] ABSTRACT

The invention relates to a refrigeration system of the air cycle cooling system type, also called reversed Brayton cycle in which the air flow through compressor means (12, 16), heat exchanger means (24) for withdrawal of heat from the compressed air and finally expander means (22) from where it is delivered to perform cooling. According to the invention the system includes heat load means (41) having a large flow resistance, creating a considerable over-pressure at the expander outlet (23). A rotary screw machine is included in the expander (22) and also in the compressor means (12, 16), which latter screw rotor machine (12) is driven solely by the screw rotor machine (22) of said expander means. A screw rotor machine (16) connected in parallel with the screw rotor machine (12) of said compressor means is driven separately, preferably by a drive engine (19), the rotational speed of which si controlled by pressure sensing means (36) in a conduit between the expander outlet (23) and an inlet to the heat load means (41), and thereby—via said expander means—also drive the velocity of the screw rotor machine (12) of said compressor means. The system is particularly intended for cooling the electronic equipment in air-craft when being on the ground.

36 Claims, 2 Drawing Sheets

SYSTEM AND METHOD FOR PERFORMING COOLING

The present invention relates to a system for performing cooling as specified in the preamble of claim 1 and to a method for the operation of such a system as specified in the preamble of claim 8.

Refrigeration systems usually employ a two-phase cycle with a refrigerant that alternates between gaseous and liquid states. Such systems have a large cooling capacity due to the amount of heat that can be taken up when the refrigerant evaporates and are therefore superior to any alternative in most applications, normally also for air-conditioning. However, the equipment in such a system is circumstantial and expensive and requires a closed piping circuit to isolate the usually pollutional refrigerant from the environment. And since refrigeration systems at the end transfer the cold through air or another gas, these conventional systems incorporates both a primary cooling medium, i.e. the refrigerant in the closed circuit and a secondary cooling medium, i.e. the air that transfers the cold to the object to be cooled.

Since long it has been known that refrigeration also can be attained by an air cycle cooling system, also called open reversed Brayton cycle. In such a system the air (or another gas) itself is the working medium in the refrigeration cycle. There is thus no need for a special refrigerant that is cyclically condensed and evaporated and there is no need to transfer the cold from a refrigerant to the air, since they are one and the same. Such systems therefore also eliminate the risk for pollution. In a cooling system according to this principle the gas, normally air is first compressed, whereby the pressure and the temperature rise. The warm compressed gas is then cooled in a heat exchanger and thereafter expanded with substantially the same pressure ratio as that of the compressor. The air leaving the expander will be cooler than the air entering the compressor and can perform its cooling purpose, e.g. air-conditioning, which normally takes place at atmospheric pressure, i.e. the same pressure as the compressor inlet pressure if located at ground level.

However, the air cycle cooling system has a very small cooling capacity in comparison with a conventional refrigeration system. Therefore the parts making up the system has to be comparatively large and, in relation to the cooling capacity expensive, in particular since reciprocating piston machines and/or dynamic machines normally are used for the compression and expansion. Such systems therefore in most situations are not a practical alternative to conventional refrigeration systems and have consequently very rarely come into use.

Should such a cooling cycle be-employed in a system where the nature of the means requiring cooling is such that a substantial over-pressure will prevail in the delivery line, the demands of the components of the cycle will be still more critical. Due to the over-pressure, the temperature at the outlet of the expander will be higher than if the expander outlet pressure had been closed to the inlet pressure of the system. This requires to be compensated by a correspondingly higher compressor pressure ratio for reaching a sufficiently low expander outlet temperature. One situation when this problem will occur is when the cold air is used to cool electronic equipment, e.g. in air-craft. Since the air in such an application has to pass through a large number of very narrow channels, the air leaving the expander receives a substantial over-pressure due to the flow resistance in this pattern of narrow channels.

In the specification and the claims the following expressions are to be understood as indicated:

Over-pressure:
  Actual pressure minus substantially atmospheric pressure.
Compressor pressure ratio:
  The ration between the pressures at the outlet and inlet means of a compressor.
Compressor internal pressure ratio:
  The ratio between the end pressure and filling pressure of a rotary screw compressor.
Expander pressure ration:
  The ratio between the pressures at the inlet and outlet means of an expander.
Expander internal pressure ratio:
  The ratio between the filling pressure and end pressure of a rotor screw expander.

It is earlier known to use machines of the vane-type for the compression and expansion in air cycle cooling systems as disclosed in U.S. Pat. No. 3,686,893. And in U.S. Pat. No. 3,965,697 another type of rotary displacement machines is used in such a cycle. The machines used in these disclosures, however, have not large enough volume capacity to be a practical alternative in this kind of refrigeration cycle, in particular not if being a part of a system of the above described kind.

U.S. Pat. No. 4,291,547 discloses the use of rotary screw machines for compression and for expansion in a Brayton cycle. The device of this disclosure, however, relates to a cryogenic system using nitrogen or a similar gas as working medium, which operates with the high pressure level at atmospheric pressure.

U.S. Pat. No. 3,045,447 discloses an air cycle cooling system using a rotary screw machine for expanding the air. The system does not include a special compressor with the sole purpose to provide the expander with compressed air, but the compressed air is taken from the compressor in the power unit of an air-craft. Since the compressor is of the centrifugal type and since it is not adapted to the purpose of being a part of the cooling system, the system will be circumstantial and have a poor efficiency.

In the handbook "Kylteknikern" by Matts Bäckström, Almqvist & Wiksells Boktryckeri AB, 1970, on page 768 of the third edition, it is noted that machines of the rotary screw type are very suitable for use in an air cycle cooling system, and DE 42 18 299 discloses such system operating with rotary screw machines for the compressing and expanding of the air.

In all the above mentioned disclosures the devices are used to deliver the cooling air from the expander at a pressure that is about compressor inlet pressure or, in the cases nothing is said about it, this apparently is to be understood since this normally is the case. A certain flow resistance, however, in any case will be present when the cooling air is delivered and performs its cooling. About compressor inlet pressure therefore means slightly above; in the magnitude of one percent or less. This means that the over-pressure normally will be of about the same small percentage also of the pressure increase across the compressor. Since none of these known devices is particularly intended for delivering the cooling air at a substantial over-pressure, none of them faces the problems related to such an application, briefly discussed above.

The object of the present invention is therefore to attain a system and a method of the kind in question which by an uncomplicated structure and control is suitable to be used where the air has a substantial over-pressure when performing its cooling.

This has according to the invention been achieved in that a system of the kind specified in the preamble of claim 1 includes the features specified in the characterising portion of the claim and in that a method as specified in the preamble of claim 8 includes the steps specified in the characterizing portion of that claim.

A machine of the rotary screw type is in relation to its size capable to compress or expand a large gas volume and is therefore very suitable in a process operating according to the air cycle cooling system. Such a system including a rotary screw machine for the expansion and preferably also for the compression therefore will be efficient in relation to its weight and considerably reduce some of the drawbacks normally entailing systems of this kind.

As mentioned, the use of rotary screw machines in an ordinary air cycle cooling system is known per se, e.g. by the handbook "Kylteknikem" and DE 42 18 299, and some of the general advantages thereby attained are recognized.

Investigations and calculations have evinced additional advantages with a rotary screw machinery when an air cycle cooling system operates with a substantial over-pressure in the delivered air. The higher temperature of the expander outlet air due to the over-pressure normally should have required to be compensated by considerably increasing the pressure rise in the compressor. However, if using a rotary screw machinery it has been found that an acceptable low temperature level can be attained with only a minor increase of the pressure rise in the compressor. A sufficient low temperature thus is reached with a pressure rise in the compressor of less than ten times the over-pressure. In an ordinary air cycle cooling system this relation is in the magnitude of 100: 1. Through the invention the constructional peculiarities of a rotary screw machine are taken advantage of in a specific application, in which these advantages become particularly salient. The moderate pressure ratio that can be accepted for the compressor contributes to keep the costs of the components relatively low.

The invention is suitable to use for air-conditioning and is particularly intended for cooling the electronic equipment of air-craft when being on the ground, an application where the above mentioned advantages are of great importance.

According to the invention the compressor means includes more rotary screw machines than the expander means which are arranged in parallel. The rotary screw machines of the compressor means have larger internal volume ratio than the rotary screw machines of the expander means, and a modular system can be constituted in that the rotary screw machines are components that are equal in some respects. Therethrough the manufacturing costs are reduced and a larger flexibility is attained.

In a preferred embodiment of the invention a regulating system is provided for regulating either or both of the temperature and the mass flow of the gas delivered.

These and other advantageous embodiments of the invented system and method are specified in the dependent claims.

Figure 2:
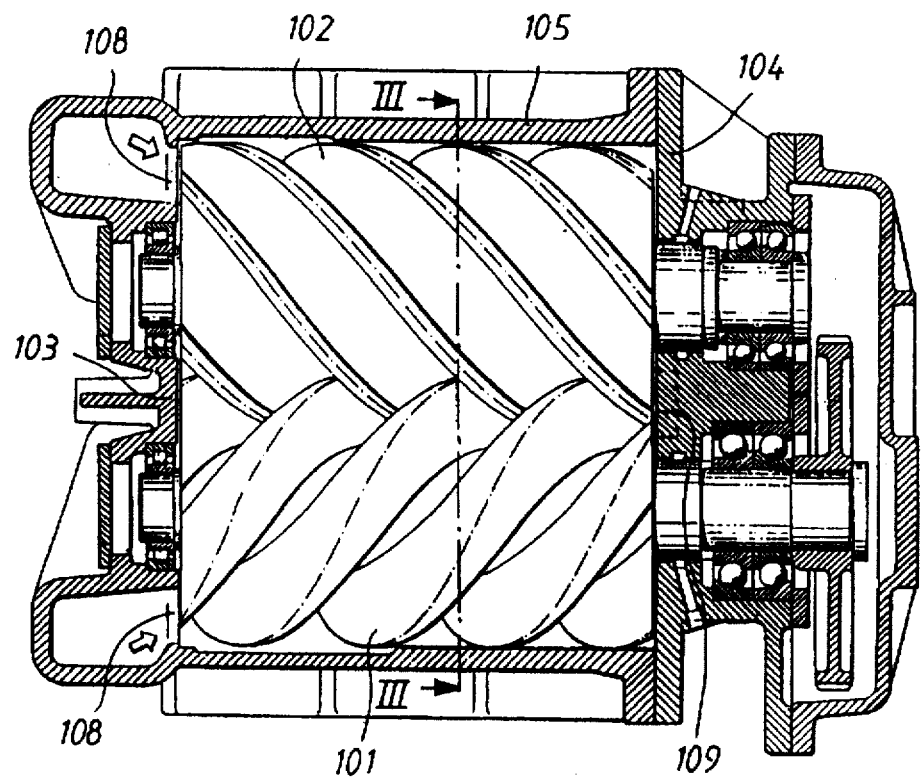
Figure 3:
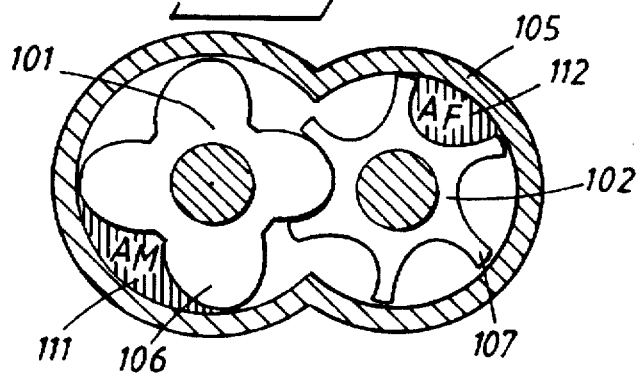
Figure 4:
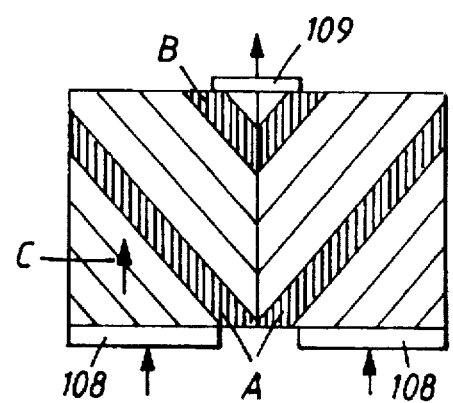
Figure 5:
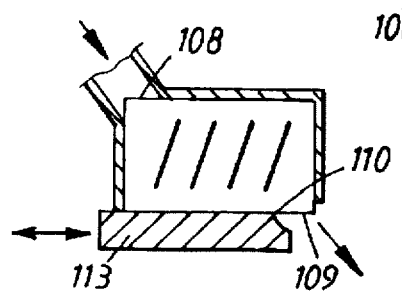

The invention will be further explained through the following detailed description of a preferred embodiment thereof and with reference to the accompanying drawings of which FIG. 1 is a scheme illustrating the invented system, FIG. 2 is a longitudinal section through a rotary screw compressor, FIG. 3 is a section through line III—III in FIG. 2, FIG. 4 is a schematic developed view of a rotary screw compressor and FIG. 5 illustrates means for regulating the internal volume ratio of a rotary screw compressor.

In FIG. 1 the system is schematically illustrated for an application in Which cold air is used to cool electronic equipment 41 of air-craft when being on the ground. The main components of the system are two rotary screw compressor 12, 16, a rotary screw expander 22, a main heat exchanger 24 and the electronic equipment 41. The inlet ports 11, 15 of the compressors 12, 16 are connected to ambient air through a first conduit 10 and the outlet ports 13, 17 of the compressors are connected to the inlet port 21 of the expander 22 through a second conduit 20. The main heat exchanger 24 is in heat exchanging relation with this second conduit 20. The outlet port 23 of the expander is through a third conduit 30 connected to an inlet opening 31 of the space 40 containing the electronic equipment 41.

One of the compressors 12 is through an interconnection shaft 14 driven by the expander 22 and the other compressor 16 through a driving shaft 18 by an electric motor 19. The internal volume ratio of each compressor is higher than the internal volume ratio of the expander, which results in that the internal pressure ratio in each compressor is higher than the internal pressure ratio in the expander. How internal volume ratio for a rotary screw machine is defined is later explained with reference to FIG. 4.

The electronic equipment 41 that is to be cooled by the air has a large number of tightly packed components with narrow interspaces between them. These interspaces form a complex network or labyrinth of flow channels with large flow resistance so that a considerable pressure difference will develop across the electronic equipment as the air passes therethrough at a certain velocity.

The inlet air of atmospheric pressure flows through the first conduit 10 to the compressors 12, 16 in which it is compressed, whereby also its temperature rises. The compressed air is then cooled in the main heat exchanger 24 and thus enters the expander 22 with a considerably lower temperature than the air leaving the compressors, whereas the pressure is almost the same. In the expander 22 the air is expanded back to a lower pressure again, but higher than the compressor inlet pressure, and due to the expansion the air is further cooled. Cold air of over-pressure thus leaves the expander outlet port 23 and is through the third conduit 30 delivered to the inlet opening 31 of the space 40 containing the electronic equipment 41, from where it is vented through an opening 42.

The lower pressure at the expander outlet 23 will be at a substantial over-pressure due to the large flow resistince in the electronic equipment 41. In comparison with the flow resistance in the electronic equipment 41 the pressure drop in the third conduit means 30 is almost negligible, and the contribution of the latter in creating the over-pressure at the expander outlet 23 is well below 20 %.

Since the temperature at the expander outlet 23 has to be low enough to perform the cooling of the electronic equipment and since a higher expander outlet pressure leads to a higher expander outlet temperature, the over-pressure at the expander outlet 23 has to be compensated by a higher expander inlet pressure. However, by employing a rotary screw machine in the expander, the demand on increased expander inlet pressure can be kept at a minimum. It will therefore be possible to use a compressor with a pressure ratio that is relatively moderate. The compressor means 12, 16 of the system has a pressure ratio that corresponds to a pressure rise less than ten times the over-pressure at the expander outlet 23, which will be sufficient to keep the expander outlet temperature at an acceptable low level. This means that the expander pressure ratio is less than 90 % of the compressor pressure ratio. Through the lower internal volume ratio of the expander 22 in comparison with the compressors 12, 16 overexpansion is avoided.

During the process when the air is cooled the temperature will fall below its saturation temperature in parts of the system so that water droplets are generated. Therefore a water separator 25, 32 is provided in the second 20 and in the third 30 conduit, respectively, to withdraw that water so that the air delivered to the electronic equipment will be substantially dry. To eliminate the risk for that water is generated due to the pressure drop in the electronic equipment, the conduit 30 is provided with heating means 37 for slightly raising the temperature of the air before being delivered to the electronic equipment.

The cooling capacity of the main heat exchanger 24 can be varied to adapt the system to different operating conditions. In the illustrated embodiment this is accomplished in that the electric motor 28 of a fan 27 blowing air across the main heat exchanger 24 is provided with speed governing means 29, controlled via a signal circuit 50 by a temperature sensor 35, sensing the air temperature in the third conduit 30.

Means are also provided to regulate the mass flow of air delivered through the third conduit 30. These means include a pressure sensor 36, sensing the pressure in the third conduit 30, which sensor via a signal circuit 51 controls a speed governor 38 of the electric motor 19 driving one of the compressors 16, which as a consequence delivers a less or larger amount of air. It is also possible to attain the mass flow regulation by throttling air flowing through the first conduit 10.

The figure also illustrates an alternative way for regulating the mass flow of delivered air, in that a branch conduit 33 is connected to the third conduit 30 for withdrawal of air therefrom, the amount of air withdrawn being regulated by a valve 34 in the branch conduit 33. To make use of the cold in the air withdrawn from the third conduit 30, this air can be conducted to the first conduit 10 and cool the incoming air by mixing therewith or alternatively as illustrated in the figure to cool the air in the second conduit 20 through a secondary heat exchanger 26 located downstream the main heat exchanger 24. After the secondary heat exchanger 26 the branch conduit 33 passes the air stream from the fan 27 to cool this air stream, thereby increasing the heat exchange in the main heat exchanger 24.

In the table below typical values for temperature and pressure of the air in different parts of the system are given:

| System point (see FIGURE): | I | II | III | IV | V | VI |
|---|---|---|---|---|---|---|
| Temperature °C.: | 30 | 150 | 35 | 2 | 6 | 40 |
| Pressure, bars: | 1.01 | 2.5 | 2.45 | 1.5 | 1.45 | 1.01 |

In the illustrated embodiment both the compressors 12, 16 and the expander 22 are of the rotary screw type in order to gain as much as possible from the advantages that are attained by the feature to employ such machines in the system. A very economical module construction is attained in that the two compressors 12, 16 and the expander 22 have the same main dimensions, the same theoretical maximum displacement volumes and substantially equal screw rotors. And since the compressor 12 is directly driven by the expander 22 the relation between their rotational speeds will be constant. By connecting the male rotor of the compressor 12 to the female rotor of the expander 22 this relation will be 1:1.5 without any intermediate gearing if the male rotors have four lobes and the female rotors six lobes. The expander 22 is provided with a device for regulating the internal volume ratio thereof in any manner well-known in the field of rotary screw machine technology, e.g. by a slide valve 52 symbolically indicated in the FIG. 1 and its function being briefly explained with reference to FIG. 5.

It should be noted that with a rotary screw machine in this application is meant either a single stage machine or a multiple stage machine. Although a multiple stage machine in practice can be considered as a plurality of machines connected in series, such a machine in the application in its functional context thus is considered as one single machine.

A brief description of the structure and working principle of a rotary screw compressor will be given with reference to FIGS. 2 to 5. The main elements is the pair of meshing screw rotors 101, 102 operating in a working space limited by two end walls 103, 104 and a barrel wall 105 extending between these, which barrel wall 105 has a shape substantially corresponding to that of two intersecting cylinders as can be seen in FIG. 3. Each rotor 101, 102 has a plurality of lobes 106, 107, respectively, and intermediate grooves 111, 112, respectively, extending helically along the rotor. One rotor 101 is of the male rotor type with the major part of each lobe 106 located outside the pitch circle and the other rotor 102 is of the female rotor type with the major part of each lobe 107 located inside the pitch circle. The female rotor 102 normally has more lobes than the male rotor 101, and a common lobe combination is 4+6. Low pressure air is admired into the working space of the compressor through an inlet port 108, and is then compressed in chevron-shaped working chambers formed between the rotors and the walls of the working space. Each chamber travels to the right in FIG. 2 as the rotors rotate and the volume of a working chamber will continuously decrease during the later stage of its cycle after communication with the inlet port 108 has been cut off. Thereby the air will be compressed and the compressed air leaves the compressor through an outlet port 109. The internal pressure ratio will be determined by the internal volume ratio, i.e. the relation between the volume of a working chamber immediately after its communication with the inlet port 108 has been cut off and the volume of a working chamber when it starts to communicate with the outlet port 109.

For a rotary screw compressor or expander a theoretical maximum displacement volume $V_{Dp}$ is defined as $V_{Dp} = (A_M + A_F) \times Z_m \times L$ and is expressed in volume per revolution of the male rotor. $A_M$ and $A_F$ are the cross section areas of a male 111 and female rotor groove 112, respectively, in a section perpendicular to the rotor axes and are indicated with shaded areas in FIG. 3. L is the rotor length and $Z_m$ the number male rotor lobes 106.

The compression cycle is schematically illustrated in FIG. 4, which shows the barrel wall developed in a plane, the vertical lines representing the two cusps, i.e. the lines along which the cylinders forming the working space intersect, and the horizontal lines representing the two end planes of the working space. The inclined lines represent the sealing lines established between the lobe tops and the barrel wall, which lines travel in the direction of the arrow C as the rotors rotate. The shaded area A represents a working chamber just after it has been cut off from the inlet port 108 and the shaded area B a working chamber that has started to open towards the outlet port 109. As can be seen the volume of each chamber increases during the filling phase when the chamber communicates with the inlet port 108 and thereafter decreases.

As can be understood from the above explanation of the working principle of the rotary screw compressor the location of the outlet port determines the moment when a working chamber starts to communicate therewith, and as a consequence thereof the internal volume ratio of the compressor. The later the opening edge of the outlet port is located the higher the internal volume ratio and therewith the internal pressure ratio will be.

It is common to provide a rotary screw compressor with means to vary the internal volume ratio by adjusting the position of the opening edge of the outlet port. How this can be done is schematically illustrated in FIG. 5. A part of the barrel wall, normally along the cusp adjacent to the outlet port is arranged to be axially slidable, forming a slide valve 113. By axially moving the slide valve, the location of the opening edge 110 of the outlet port 109 is adjusted and therewith the internal volume ratio of the compressor.

For an expander of the rotary screw type the working principle is reversed in relation to what has been described above, i.e. the air enters a working chamber of small volume, and as the chamber travels the volume increases until the outlet of the expander is reached. And the internal volume ratio is regulated by adjusting the position of the closing edge of the inlet port.

We claim:

1. System for performing cooling including
   first conduit means (10) connected to air of substantially atmospheric pressure,
   compressor means (12, 16) having inlet means (11, 15) connected to said first conduit means (10) for compressing said air,
   second conduit means (20) connected to outlet means (13, 17) of said compressor means (12, 16),
   expander means (22) having inlet means (21) connected to said second conduit means (20) for expanding said air, said expander means (22) including at least one rotary screw machine,
   third conduit means (30) connected to outlet means (23) of said expander means (22),
   heat load means (41) having inlet means (31) connected to said third conduit means (30) and outlet means (42) connected to substantially atmospheric pressure,
   and main heat exchanger means (24) in heat exchanging relation with said compressed air, anywhere between said inlet means (11, 15) of said compressor means (12, 16) and said outlet means (23) of said expander means (22), said main heat exchanger means (24) withdrawing heat from said air,
said third conduit means (30) and said heat load means (41) having a flow resistance creating a pressure drop between said expander outlet means (23) and the outlet means (42) of said heat load means (41), characterized in that said compressor means (12, 16) includes more screw rotor machines than said expander means (22), which screw rotor machines of said compressor means (12, 16) are in parallel arrangement and have a larger internal volume ratio than each rotary screw machine of said expander means (22), and that at least a pair of screw rotor machines comprising a screw rotor machine (12) of said compressor means and a screw rotor machine (22) of said expander means have a constant relation between their rotational speeds established by a drive interconnection (14), which is the only one to activate the screw rotor machine (12) of said compressor means, in addition to which at least one of the screw rotor machines (16) of said compressor means is drivingly separated from said expander means (22).

2. System according to claim 1, wherein said heat load means (41) includes electronic equipment on air-craft, at least one of said second (20) and third (30) conduit means being provided with water separating means (25, 32) for withdrawal of water from the air in said second (20) and third (30) conduit means, respectively, and said third conduit means (30) being provided with heating means (37) for heating the air in said third conduit means (30).

3. System according to claim 2, being provided with a regulating system, said regulating system including at least one of first and second regulating means, said first regulating means being means for regulating the mass flow of air through said third conduit means (30), said second regulating means being means for regulating the temperature of said air in said third conduit means (30), said second regulating means including governing means (29) governing the heat exchanging capacity of said main heat exchanger means (24) and temperature sensing means (35) sensing the temperature in said third conduit means (30), said temperature sensing means (35) controlling said governing means (29).

4. System according to claim 3, wherein said main heat exchanger means (24) is in heat exchanging relation with said compressed air in said second conduit means (20) and includes air stream generation means (27), said governing means (29) governing the mass flow of said air stream (27).

5. System according to claim 4, wherein said first regulating means includes compressor speed regulating means (38) and pressure sensing means (36) said pressure sensing means (36) sensing the pressure in said third conduit means (30) and controlling said compressor speed regulating means (38).

6. System according to claim 5 wherein said first regulating means includes branch conduit means (33) connected to said third conduit means (30) and valve means (34) in said branch conduit means (33), said valve means (34) regulating the flow of air through said branch conduit means (33).

7. System according to claim 6, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

8. System according to claim 4 wherein said first regulating means includes branch conduit means (33) connected to said third conduit means (30) and valve means (34) in said branch conduit means (33), said valve means (34) regulating the flow of air through said branch conduit means (33).

9. System according to claim 8, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

10. System according to claim 3, wherein said first regulating means includes compressor speed regulating means (38) and pressure sensing means (36) said pressure sensing means (36) sensing the pressure in said third conduit means (30) and controlling said compressor speed regulating means (38).

11. System according to claim 10 wherein said first regulating means includes branch conduit means (33) connected to said third conduit means (30) and valve means (34) in said branch conduit means (33), said valve means (34) regulating the flow of air through said branch conduit means (33).

12. System according to claim 11, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

13. System according to claim 3 wherein said first regulating means includes branch conduit means (33) connected to said third conduit means (30) and valve means (34) in said branch conduit means (33), said valve means (34) regulating the flow of air through said branch conduit means (33).

14. System according to claim 13, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

15. System according to claim 1, being provided with a regulating system, said regulating system including at least one of first and second regulating means, said first regulating means being means for regulating the mass flow of air through said third conduit means (30), said second regulating means being means for regulating the temperature of said air in said third conduit means (30), said second regulating means including governing means (29) governing the heat exchanging capacity of said main heat exchanger means (24) and temperature sensing means (35) sensing the temperature in said third conduit means (30), said temperature sensing means (35) controlling said governing means (29).

16. System according to claim 15, wherein said main heat exchanger means (24) is in heat exchanging relation with said compressed air in said second conduit means (20) and includes air stream generation means (27), said governing means (29) governing the mass flow of said air stream (27).

17. System according to claim 16, wherein said first regulating means includes compressor speed regulating means (38) and pressure sensing means (36) said pressure sensing means (36) sensing the pressure in said third conduit means (30) and controlling said compressor speed regulating means (38).

18. System according to claim 17 wherein said first regulating means includes branch conduit means (33) connected to said third conduit means (30) and valve means (34) in said branch conduit means (33), said valve means (34) regulating the flow of air through said branch conduit means (33).

19. System according to claim 18, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

20. System according to claim 16 wherein said first regulating means includes branch conduit means (33) connected to said third conduit means (30) and valve means (34) in said branch conduit means (33), said valve means (34) regulating the flow of air through said branch conduit means (33).

21. System according to claim 20, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

22. System according to claim 15, wherein said first regulating means includes compressor speed regulating means (38) and pressure sensing means (36) said pressure sensing means (36) sensing the pressure in said third conduit means (30) and controlling said compressor speed regulating means (38).

23. System according to claim 22 wherein said first regulating means includes branch conduit means (33) connected to said third conduit means (30) and valve means (34) in said branch conduit means (33), said valve means (34) regulating the flow of air through said branch conduit means (33).

24. System according to claim 23, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

25. System according to claim 15, wherein said first regulating means includes branch conduit means (33) connected to said third conduit means (30) and valve means (34) in said branch conduit means (33), said valve means (34) regulating the flow of air through said branch conduit means (33).

26. System according to claim 25, wherein said second conduit means (20) is provided with secondary heat exchanger means (26), said branch conduit means (33) being in heat exchanging relation with said second conduit means (20) through said secondary heat exchanger means (26) for withdrawal of heat from the air in said second conduit means (20).

27. A method for performing cooling by compressing air of substantially atmospheric pressure, expanding said compressed air in at least one rotary screw machine (22), cooling said air after the compression has started but before the expansion has ended, delivering said expanded air to heat load means (41), cooling said heat load means (41) with said delivered air and venting said air from said heat load means (41) to substantially atmospheric pressure, thereby establishing an air flow, said delivering and said cooling of said heat load means (41) creating a pressure drop in said air flow, characterized by the measures of using more rotary screw machines for said compressing than are used for said expanding, arranging said rotary screw machines used for said compressing in parallel, using rotary screw machines of larger internal volume ratio for said compressing than for said expanding and having at least a pair of screw rotor machines comprising a screw rotor machine (12) of said compressor means and a screw rotor machine (22) of said expander means to run with a constant relation between their rotational speeds by a drive interconnection (14) being the only one influencing the screw rotor machine (12) of said compressor means, in addition to which at least one of the screw rotor machines (16) of said compressor means being drivingly separated from said expander means (22).

28. A method according to claim 27, wherein said heat load means (41) includes electronic equipment on air-craft and including the measures of separating and withdrawing water from said air flow and heating said air during said delivering.

29. A method according to claim 28 including regulating at least either of the mass flow and the temperature of the air delivered to said heat load means (41), water from said air flow and heating said air during said delivering.

30. A method according to claim 29, wherein said mass flow is regulated by regulating the compressing speed, sensing the pressure of said air during said delivering and controlling said speed regulation in response to the sensed pressure by speed regulation of the screw rotor machine (16) which is drivingly separated from said expander means (22), and thereby—via said expander means—also speed regulation of the screw rotor machine (12) connected to said expander means (22), and wherein said temperature is regulated by governing said cooling of said air, sensing the temperature of said air during said delivering and controlling said governing in response to the sensed temperature.

31. A method according to claim 29, wherein said mass flow is regulated by withdrawing air during said delivering and regulating the amount of withdrawn air, and said temperature is regulated by governing said cooling of said air, sensing the temperature of said air during said delivering and controlling said governing in response to the sensed temperature.

32. A method according to claim 31 including conducting said withdrawn air into heat exchanging relation with said air flow after the compressing but before the expanding.

33. A method according to claim 27 including regulating at least either of the mass flow and the temperature of the air delivered to said heat load means (41).

34. A method according to claim 33, wherein said mass flow is regulated by regulating the compressing speed, sensing the pressure of said air during said delivering and controlling said speed regulation in response to the sensed pressure by speed regulation of the screw rotor machine (16) which is drivingly separated from said expander means (22), and thereby—via said expander means—also speed regulation of the screw rotor machine (12) connected to said expander means (22), and wherein said temperature is regulated by governing said cooling of said air, sensing the temperature of said air during said delivering and controlling said governing in response to the sensed temperature.

35. A method according to claim 33, wherein said mass flow is regulated by withdrawing air during said delivering and regulating the amount of withdrawn air, and said temperature is regulated by governing said cooling of said air, sensing the temperature of said air during said delivering and controlling said governing in response to the sensed temperature.

36. A method according to claim 35 including conducting said withdrawn air into heat exchanging relation with said air flow after the compressing but before the expanding.

\* \* \* \* \*

UNITED STATES PATENT AND TRADEMARK OFFICE
CERTIFICATE OF CORRECTION

PATENT NO. : 5,732,560
DATED : Mar. 31, 1998
INVENTOR(S) : Thuresson et al

It is certified that error appears in the above-identified patent and that said Letters Patent is hereby corrected as shown below:

Title page, [57] Abstract, line 16, change "si" to --is--.

Col 10, lines 62-63 (Claim 29, lines 3 - 4), delete, "water from said air flow and heating said air during said delivering.".

Signed and Sealed this

Seventh Day of September, 1999

Attest:

Q. TODD DICKINSON

Attesting Officer     Acting Commissioner of Patents and Trademarks